(12) United States Patent
Johnson

(10) Patent No.: US 7,722,290 B2
(45) Date of Patent: May 25, 2010

(54) TRANSPORTABLE WAVE GENERATING MODULE AND WATERCRAFT

(76) Inventor: Garrett T. Johnson, 2700 International Blvd., Virginia Beach, VA (US) 23452

( * ) Notice: Subject to any disclaimer, the term of this patent is extended or adjusted under 35 U.S.C. 154(b) by 448 days.

(21) Appl. No.: 11/894,408

(22) Filed: Aug. 21, 2007

(65) Prior Publication Data

US 2008/0044230 A1 Feb. 21, 2008

Related U.S. Application Data

(63) Continuation-in-part of application No. 11/434,671, filed on May 16, 2006, now abandoned.

(60) Provisional application No. 60/681,502, filed on May 16, 2005, provisional application No. 60/878,784, filed on Jan. 6, 2007.

(51) Int. Cl.
*A47K 3/10* (2006.01)
(52) U.S. Cl. .............................. 405/79; 472/128; 4/491
(58) Field of Classification Search .................. 405/79; 472/128; 4/491
See application file for complete search history.

(56) References Cited

U.S. PATENT DOCUMENTS

| | | | |
|---|---|---|---|
| 5,098,222 A * | 3/1992 | Robinson | 405/79 |
| 5,833,393 A * | 11/1998 | Carnahan et al. | 405/79 |
| 6,964,069 B2 * | 11/2005 | English et al. | 4/491 |
| 7,478,441 B2 * | 1/2009 | Johnson | 4/491 |
| 7,497,643 B2 * | 3/2009 | Carnahan et al. | 405/25 |

\* cited by examiner

*Primary Examiner*—Tara Mayo-Pinnock
(74) *Attorney, Agent, or Firm*—Williams Mullen; M. Bruce Harper

(57) ABSTRACT

A transportable module for use in generating waves in a body of water, having a tubular chamber with a predetermined length and width equal to or less than the maximum length permitted for transportation on a predetermined type of road. The chamber includes a rear valve located at the rear end to permit flow into the chamber and substantially block flow out of the chamber and a gas port proximate to the rear end for the admission of compressed gas into the chamber. The module includes an anchoring system, such as an integrated ballast tank, a connecting system mounted on the outer surface of the module by which the module may be detachably connected in parallel with other such modules in a side to side manner to form a barge or scalable wave generator. Individually, the modules are is capable of being transported by road to a desired body of water for use.

20 Claims, 9 Drawing Sheets

TRANSPORTABLE WAVE GENERATING MODULE AND WATERCRAFT

CROSS REFERENCE TO RELATED APPLICATIONS

The present application is a continuation-in-part of U.S. application Ser. No. 11/434,671, filed May 16, 2006 now abandoned, which claimed priority from U.S. Provisional Application Ser. No. 60/681,502, filed May 16, 2005; the present application also claims priority to U.S. Provisional Application Ser. No. 60/878,784, filed Jan. 6, 2007, all of which are incorporated herein by reference.

FIELD OF THE INVENTION

The present invention relates to the generation of waves. More particularly, the present invention is a mobile and scalable embodiment of a wave generator, suitable for use in natural environments.

BACKGROUND OF THE INVENTION

Sports or other entertainment events that rely on waves or surf are traditionally limited to times or locations that have amenable conditions. In some locations, the surf is routine and predictable, while in others the quality of the surf may vary significantly. Further, there are many areas amendable to surf or wave sports where there may be little or no wave or surf action, as with certain east coast US or lakeside beaches.

The state of California hosts some of the more predictable surfing beaches in the continental United States. The beaches of Florida are somewhat unpredictable, and the surf there tends to be more active and stronger than those higher on the east coast. The beaches higher on the east cost may be relatively calm or moderate, with only occasional periods of challenging surf. Nevertheless, beaches such as those on the east coast of the United States might otherwise be suitable for surfing sports if the surf were to be both reliable and substantial.

Some surfers approach this problem with attempts to use waves generated by the wake of a large vessel or a separate tow at speed. This approach requires a vessel or a tow to be of substantial displacement in order to generate a suitable wave for surfing; in addition, it may involve considerable energy consumption and a degree of unpredictability in wake generation. In one example, surfers near Galveston, Tex. take advantage of shipping traffic and surf the wakes of underway supertankers; of course, this is impractical for the purposes described herein.

A conventional approach involves a plow device designed to be drawn along permanent tracks located within a body of water. While potentially suitable for pools or otherwise placid lakes, this somewhat complicated arrangement is impractical for many natural environments, particularly natural ocean beaches where marine items might obstruct the track. A similar approach is a wave generating device or plow mounted onto the hull of a small boat or towed behind. The device includes a curved flow forming portion capable of displacing water and creating waves somewhat perpendicular to the direction of the boat. Of course, such a boat would require significant maneuvering space for clear navigation and hazard avoidance, and would be difficult to use to generate waves on a beach. Importantly, the larger the device the more difficult it becomes to move and control.

Another conventional approach involves an unmoored vessel that generates waves by dumping water onto a submerged platform attached to the side hull of the vessel. The platform is shaped so as to create a wave form in the deflected water. Internally, the vessel includes an open top water tank with a pumping system to fill the tank from the surrounding water. Hydraulic actuators and a supporting hydraulic system are required to elevate a waterproof (sealed) floor or platform of the tank. As the platform is elevated, the water is spilled out of the top of the tank and onto the submerged platform, deflecting water into a wave form. A thruster is required to hold the vessel in place during water dumping or the vessel will move and the kinetic energy of the wave will be reduced.

Although this approach may be used in a natural environment, its extensive mechanical systems would be prohibitively expensive and vulnerable to corrosion. For example, an embodiment capable of dumping sea water should include a sea chest intake, pipes, pumps, valves, and a tank system, all fabricated from a corrosion resistant material such as monel, copper-nickel alloys, or bronze. The hydraulic system and actuators must include substantial components (e.g., hydraulic pump, tubing, actuator, etc.) to lift the weight of such a large volume of water. Further, elevating liquids in an open tank on a vessel will raise the center of gravity, and increase the moment with the center of buoyancy, affecting the stability characteristics of the vessel. The partially filled tank, with its free surface and open top can be further destabilizing. Accordingly, the vessel must be quite large to support the unusual instability characteristics. The only means for adjusting the size of waves is by quantity of water elevated, which is inefficient. Further, the vessel itself must be quite large for such a limited use, and is thus cost prohibitive.

Another approach is a mobile "wave effect" device, which is capable of being moved about on land and assembled where desired. This device does not involve real waves, but wave forms that simulate the effect of a wave. It relies on a mold or wave-shaped shell, typically fabricated of fiberglass, and pumps that force water over the wave mold to create sufficient laminar flow for in-place surfing. Of course, this approach is somewhat limited and does not incorporate the natural environment into the artificial waves.

Thus, a simple device for creating reliable and substantial surf in a natural beach environment would increase the attractiveness and commercial potential for many beaches. At the same time, such a device should be stable, inexpensive, and mobile. Preferably, such a device would also be capable of being adapted for transportation on land and scalable to respond to environments requiring surf of different sizes and difficulty.

BRIEF SUMMARY OF THE INVENTION

The present invention is directed to overcoming the drawbacks of conventional approaches and to creating scalable high volume waves sufficient to support surf dependent sports, even in natural environments that have otherwise unreliable or inadequate surf. The present invention improves on fixed, unscalable wave generators described as pneumatic wave cannons, as disclosed in U.S. Pat. No. 5,833,393 to Carnahan et al., which is hereby incorporated by reference.

In the open ocean, surface waves are primarily created by winds that cause variations in surface pressure. Wind duration, strength, and surface coverage area contribute to the resulting, somewhat sinusoidal wave. As a wave reaches a point where the water depth is less than half of the wavelength, then friction from the bottom begins to affect the wave. The wave energy acts to preserve its original form, resulting in a taller wave crest. Friction also slows the progression of the wave in a manner that affects lower portions of the wave more than upper portions, distorting the sinusoidal pattern. When the depth becomes sufficiently shallow, then the upper crest peaks and proceeds forward, while the lower portion slows to such an extent that the wave breaks. This wave formation and breaking action is attractive and valuable to surf sports.

In contrast, the wave cannon transfers energy from the escape or release of compressed gas or air into water to create swells or waves. The wave cannon is notable for the high amount of energy transferred and for the resulting large volume waves. Notably, the wave cannon involves relatively simple supporting infrastructure: a source of compressed air and a discharge tube or elongated chamber.

The '393 disclosure by Carnahan et al. identified examples of where a wave cannon might be used in natural environments. In particular, this disclosure discussed fixing or anchoring submerged cannons (i.e., the elongated chambers of a wave cannon), which would be supplied by an air compressor and supporting equipment located onshore. This arrangement required pilings to anchor the elongated chambers and piping against the strong reaction forces during discharge. A fixed facility limits its usefulness. Pressurized gas reservoirs and compressors were located onshore to support the elongated chambers located offshore. The piping and elongated chambers were completely exposed to the marine environment, while maintenance of these elongated chambers and piping required removal or the use of undersea diving mechanics. Therefore, the permanent installation of chambers and piping underwater may share certain aspects with some of the conventional approaches described above.

However, in practice the wave cannon as disclosed in the '393 patent consumes quantities of pressurized air that have, in a number of embodiments, proven to render the wave cannon economically challenging. This problem has been discovered to be more severe in applications designed for larger bodies of water. Thus, the structures disclosed in conventional attempts, including the '393 to Carnahan, have proven expensive to implement.

Accordingly, an aspect of the invention is a transportable module for use in generating waves in a body of water, the module being capable of being delivered to a desired location by a road vehicle. An aspect of the invention is a module having a subunit formed of at lest one rigid tubular chamber and at least one rigid ballast tank, wherein the tubular chamber has a predetermined length, a rear check valve located at the rear end to permit flow into the chamber and substantially block flow out of the chamber, and a gas port proximate to the rear end for the admission of compressed gas into the chamber, the ballast tank is mounted superposed above the tubular chamber and has dimensions similar to the tubular chamber and a volume substantially equal to or greater than the volume of the tubular chamber, and at least one ballast water port for the admission and removal of ballast water. A further aspect of the module is that the chamber and ballast tank may be integrated together to form an outer surface having a bottom, two sides, and a top. A connecting system is mounted on the outer surface of the subunit by which the module may be detachably connected in parallel to other such modules in a side to side manner. A transport mount may be provided on the outer surface of the subunit capable of detachably mating to a wheeled transport unit to support a trailing end of the module when transported by the road vehicle. A coupling member may be affixed to the outer surface of the subunit positioned on the subunit end opposite the trailing end and capable of detachably coupling to a tow point on the road vehicle, by which the module may be towed when the transport mount is coupled to a wheeled unit. In this way, the module is capable of being transported to a body of water by the road vehicle, detached from the road vehicle and wheeled transport unit, transferred to a body of water, situated within a body of water at a desired location in a substantially horizontal orientation with the front end of the chamber in fluid communication with the body of water, oriented to discharge in a desired direction, the ballast tank may be filled by the admission of water in order to restrain the module in a desired location, and an admission of compressed gas into the rear end of the chamber expels water out of the front end of the chamber generating a wave in the body of water. The predetermined length may be determined by transportation safety regulations.

Another aspect of the invention is a module for use in generating waves in a body of water having a subunit comprising a rigid tubular chamber and a rigid ballast tank, wherein the tubular chamber has a rear valve located at the rear end to permit flow into the chamber and substantially block flow out of the chamber, a front valve located at the front end to permit flow out of the chamber and to control flow into the chamber, a predetermined length and width, and a gas port proximate to the rear end for the admission of compressed gas into the chamber, the ballast tank is mounted superposed above the tubular chamber and has dimensions similar to the tubular chamber and a volume substantially equal to or greater than the volume of the tubular chamber, and at least one ballast water port for the admission and removal of ballast water; and the chamber and ballast tank are integrated together to form an outer surface having a bottom, two sides, and a top. A connecting system may be mounted on the outer surface of the subunit by which the module may be detachably connected in parallel to other such modules in a side to side manner, possibly forming a barge-like watercraft. The module is capable of being situated in a desired location within a body of water in a substantially horizontal orientation with the front end of the chamber in fluid communication with the body of water, oriented to discharge in a desired direction, the ballast tank may be filled by the admission of ballasting water in order to restrain the module in a desired location, and an admission of compressed gas into the rear end of the chamber expels water out of the front end of the chamber generating a wave in the body of water.

A different aspect is a module for use in generating waves in a body of water, the module having a chamber having a predetermined length and width, a rear valve located at the rear end to permit flow into the chamber and substantially block flow out of the chamber, a front valve located at the front end to permit flow out of the chamber and to control flow into the chamber, a gas port proximate to the rear end for the admission of compressed gas into the chamber, wherein the predetermined length and width of the chamber are equal to or less than the maximum length permitted for transportation on a predetermined type of road; an anchoring system; a connecting system mounted on the outer surface of the chamber by which the chamber may be detachably connected in parallel to other such chambers in a side to side manner; wherein the chamber is capable of being transported to a desired location within a body of water, placed in a substantially horizontal orientation with the front end of the chamber in fluid communication with the body of water, oriented to discharge in a desired direction, connected to the anchoring system in order to restrain the chamber in a desired location, and an admission of compressed gas into the rear end of the chamber expels water out of the front end of the chamber generating a wave in the body of water. The anchoring system may be a ballast tank or some restraining system provided by a separate watercraft, to which the module may be able to connect. The connecting system may be detachably connected to a corresponding connecting system mounted on a watercraft and the anchor system may be provided by the watercraft.

DETAILED DESCRIPTION OF THE INVENTION

As introduced above, the present invention is an apparatus for generating high volume waves in a body of water. In particular, a transportable module is provided for use in generating waves in a body of water. Preferably, the module is capable of being delivered by land travel to a desired location by a road vehicle. The module is capable of being incorporated within a separate watercraft and/or, is capable of attachment to similar modules in parallel so as to form its own barge form of a watercraft capable of generating waves. The present invention introduces a solution to the lack of scalability and mobility of fixed wave generating devices.

An aspect of the module is a subunit of a rigid tubular chamber and a rigid ballast tank. The tubular chamber has a substantially closed rear end, preferably in the form of a one-way check valve to enable intake of make up water and an open front end, optionally with a one-way check valve for discharge of water. However, other control valves may work. The tubular chamber preferably is a predetermined length no longer than that permitted by applicable government authorities for travel along streets or highways of concern. In one embodiment, the length is about equal to or less than about fifty-three feet. The tubular chamber includes a gas port proximate to the rear end for the admission of compressed gas into the chamber to discharge water within the chamber. The ballast tank may preferably mounted superposed above the chamber and provides a volume substantially equal to or greater than the volume of the chamber, and at least one ballast water port for the admission and removal of ballast water. Alternatively, an anchoring system may be provided as discussed further herein. Alternatively, a single ballast tank may be formed when a plurality of subunits are coupled together parallel. Thus, the transportable module may be considered as a subunit and such additional systems and mounts enabling transportation and use.

An aspect of the invention is that the chamber and ballast tank may be integrated together as a subunit to form an outer surface having a bottom, two sides, and a top. Integration may be detachably or by single unit construction. Another aspect of the invention is a connecting system mounted on an external surface of the subunit or module by which the subunit or module may be detachably connected in parallel to others, in a side to side manner. Another aspect of the invention is a transport mount on the outer surface of the subunit capable of detachably mating to a wheeled transport unit to support a trailing end of the module when transported by the road vehicle. A longitudinal support member affixed to the outer surface of the subunit having a kingpin opposite the trailing end and capable of detachably coupling to a tow point on a road vehicle, by which the module may be towed when the transport mount is mated with a wheeled unit.

Figure 1A:
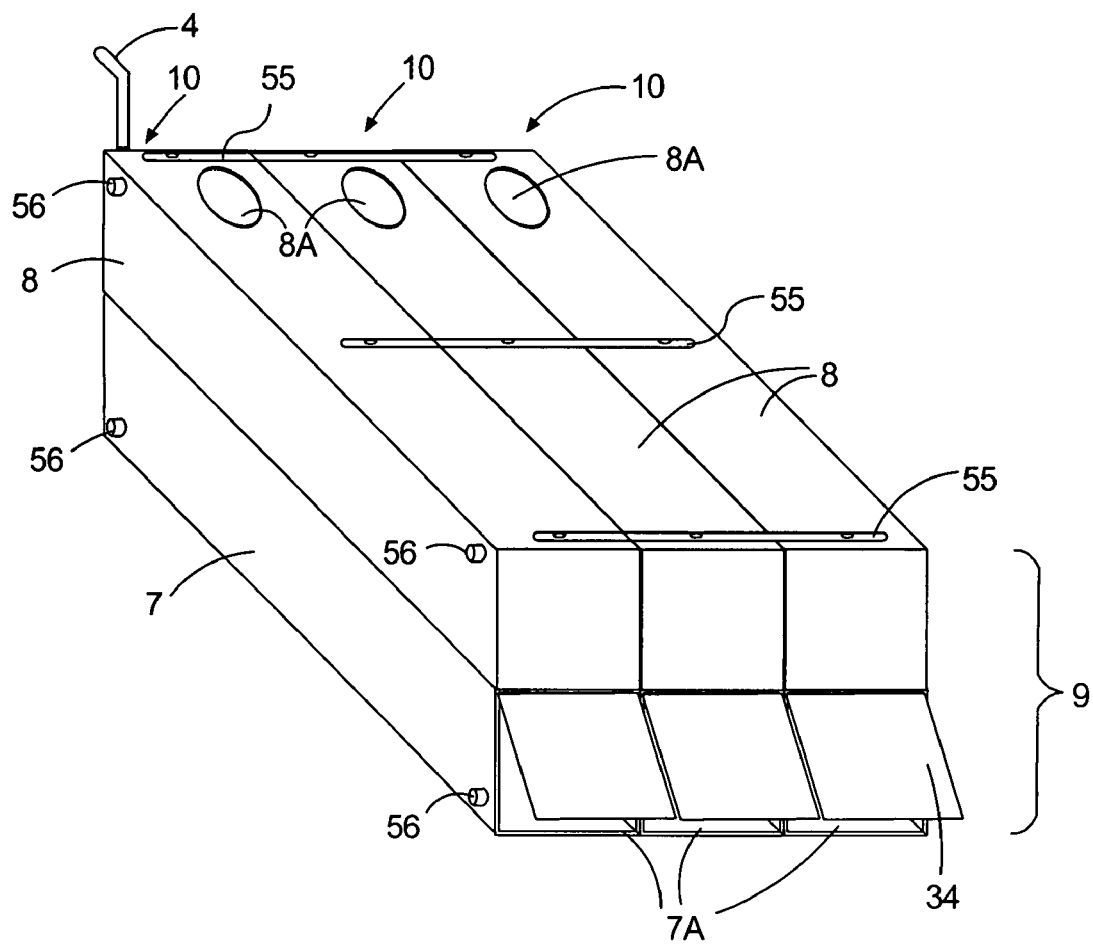
FIG. 1A is a perspective view of an embodiment of the invention.

With reference to the drawings, FIG. 1A depicts an embodiment of the invention with three modules 10 scaling to three subunits 9 in parallel or side to side configuration. Modules 10 are detachably connected via connecting system 50, which in this case comprises male extensions 56 that may be received into female receptacles (not shown) and strap 55 affixed across the tops of subunits 9. In this embodiment, ballast tank 8 is superposed above the chamber 7 to form subunits 9, both of which are shown as having a square cross section. The cross-section of both tubular chamber 7 and ballast tank 8 as shown may be rectangular or square, which has proven an efficient and easy to handle shape; however, the cross section is not limited in this respect, and circular, elliptical, triangular, or other cross sections may also be used depending on the application and structure. Superposition of ballast tank 8 above chamber 7 may provide some benefits, depending on the embodiment, such as easy access to the ballast tank 8 while forcing chamber 7 under the water level. Front valve 34 may be seen at the front end 7A of chamber 7.

Transport mount 66 (not shown) and coupling member 61 (not shown) are not visible from this angle, being preferably positioned on the bottom of outer surface; note that these elements may be mounted on opposing ends, with transport mount 66 location defining the trailing end. These aspects will be discussed in greater detail below.

Figure 1B:
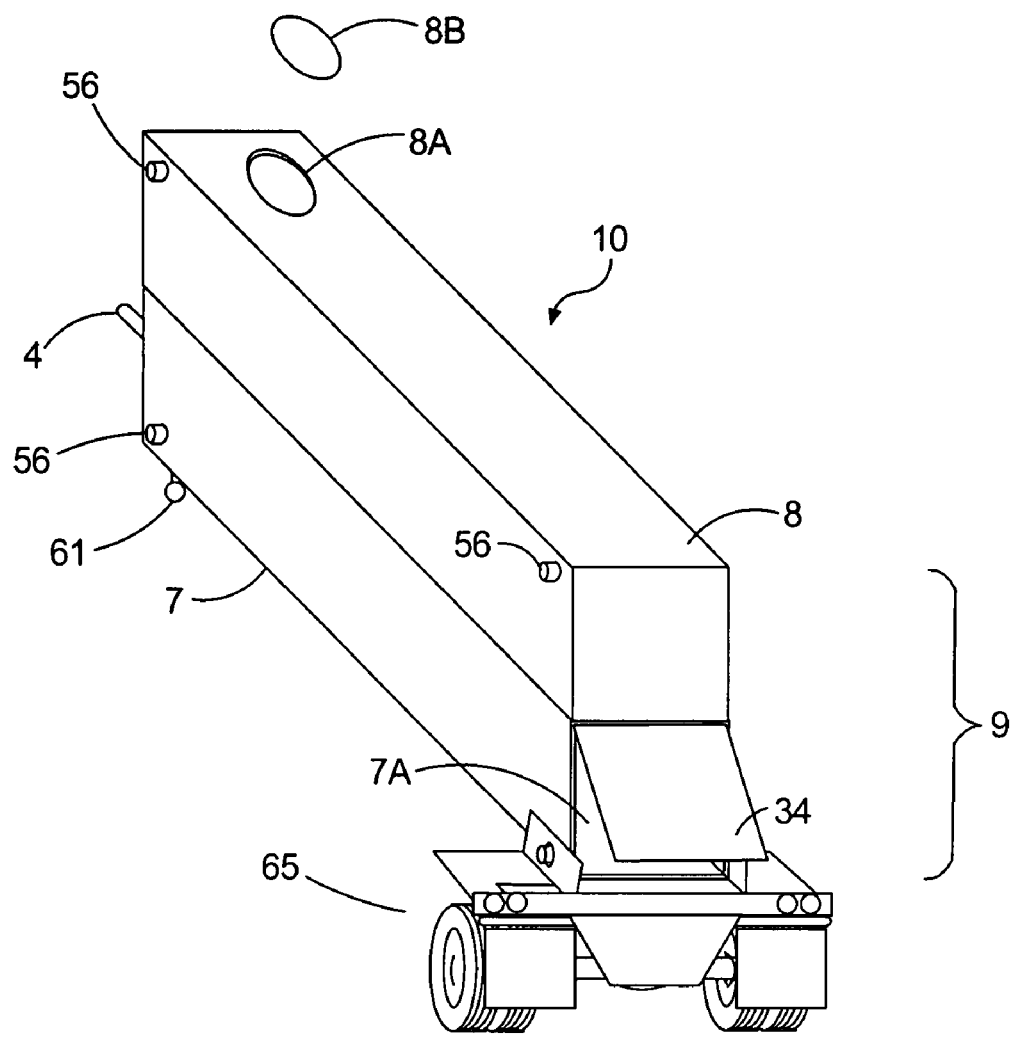
FIG. 1B is a perspective view of an embodiment of the invention.

FIG. 1B shows a module 10 with wheeled transport 65 detachably mated to subunit 9; as shown for this embodiment, male extension 56 may be used in double function as part or all of transport mount 66, which may take any of a wide variety of mounting structures. Coupling member 61 may also take a variety of mounting structures and is shown in this embodiment as a kingpin adapted to fit into a fifth wheel (not shown) of a road tractor or other road vehicle 60 (not shown). Ballast water port 8A is shown for filling or draining ballast tank 8. Optional port cover 8B may also be provided.

Figure 1C:
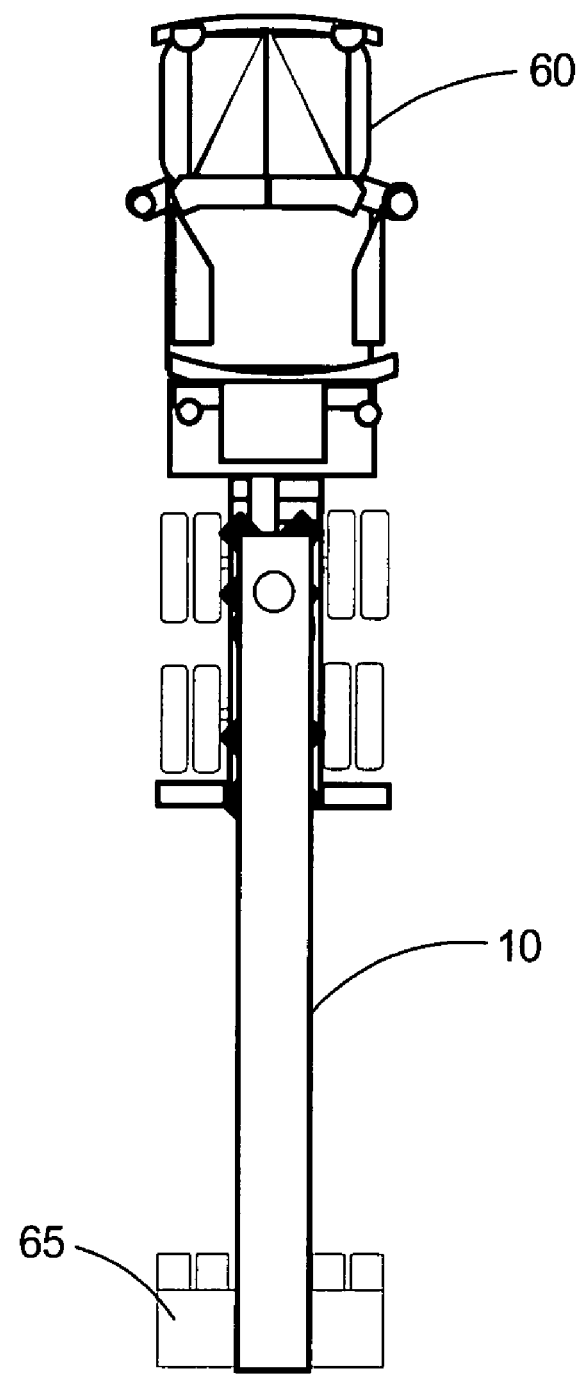
FIG. 1C is a top view of an embodiment of the invention showing a transportable configuration.

FIG. 1C is a top view of module 10 detachably coupled to road vehicle 60, a tractor configured for towing module 10 from its tow point, with wheeled transport 65 for support of the trailing end of the module 10. Such a configuration could enable a module 10 to be towed from body of water to body of water. A light crane may easily handle positioning of module 10 at its destination. Of course, a tug or light yard craft may position module 10 within the water, if desired. Preferably, the tubular chamber 7 has a predetermined length equal to or less than the maximum length permitted by applicable state safety regulations for transportation by the road vehicle on a predetermined type of road. For a number of interstates within the United States, such a predetermined length is equal to or less than about fifty-three feet. Further, a practical predetermined width for tubular chamber 7 is about twelve feet or less. If a ballast tank 8 is superposed on chamber 7, then it generally is of similar dimensions (or no greater) to form subunit 9.

Figure 1D:
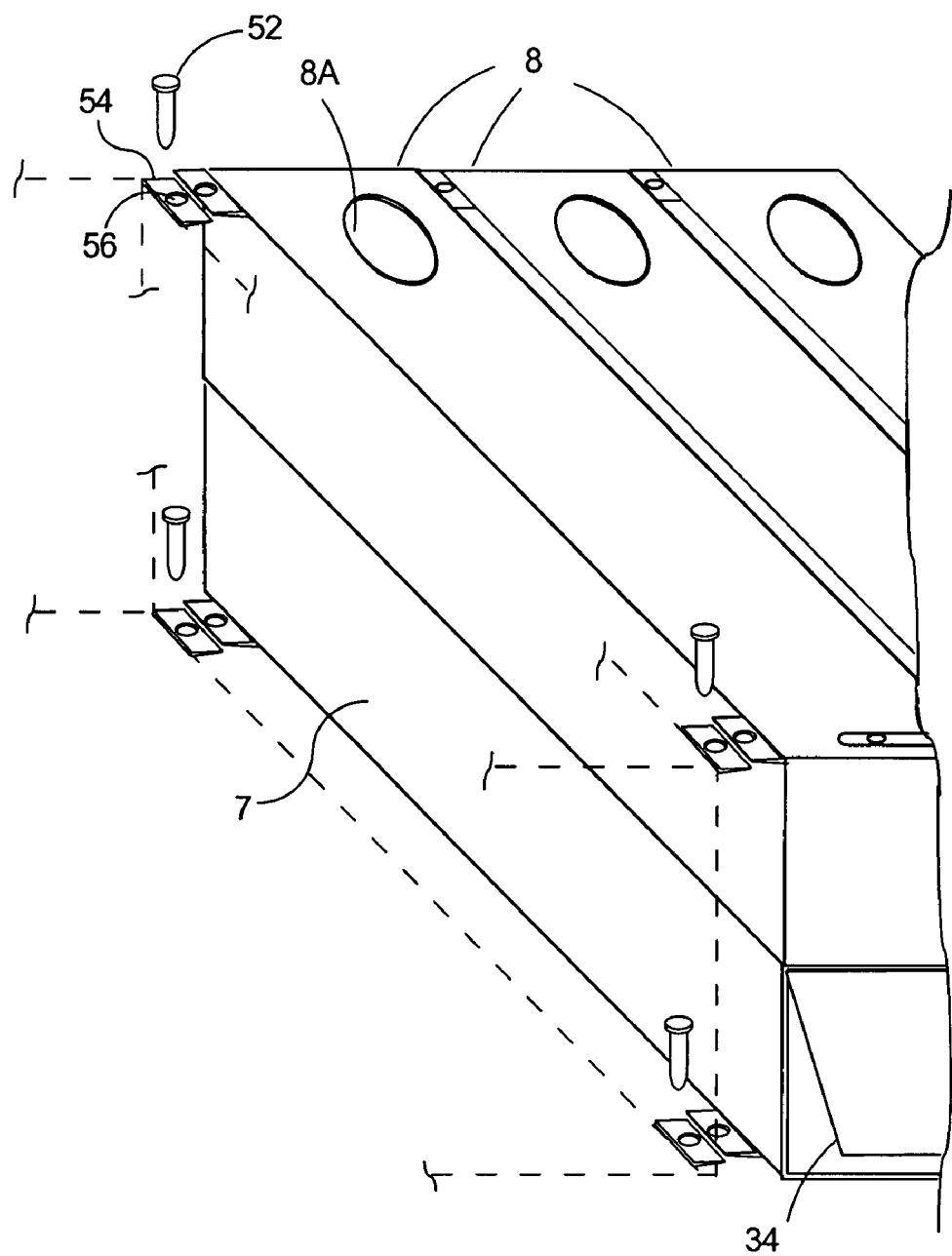
FIG. 1D illustrates a connection system.

FIG. 1D is an example illustrating an alternative embodiment of connecting system 50. In this embodiment, overlapping tabs 54 may define holes 56 that accept fasteners 52, shown in this embodiment as bolts. Other fasteners, such as toggles, screws, etc., will suffice. Such an aspect of the invention enables it to be scaled by the number of modules 10 connected in parallel, side to side, as shown. This example of connecting system 50 as shown may leave a gap between subunits 9, which may be desired in some embodiments, for handling purposes, etc.

Figure 2:
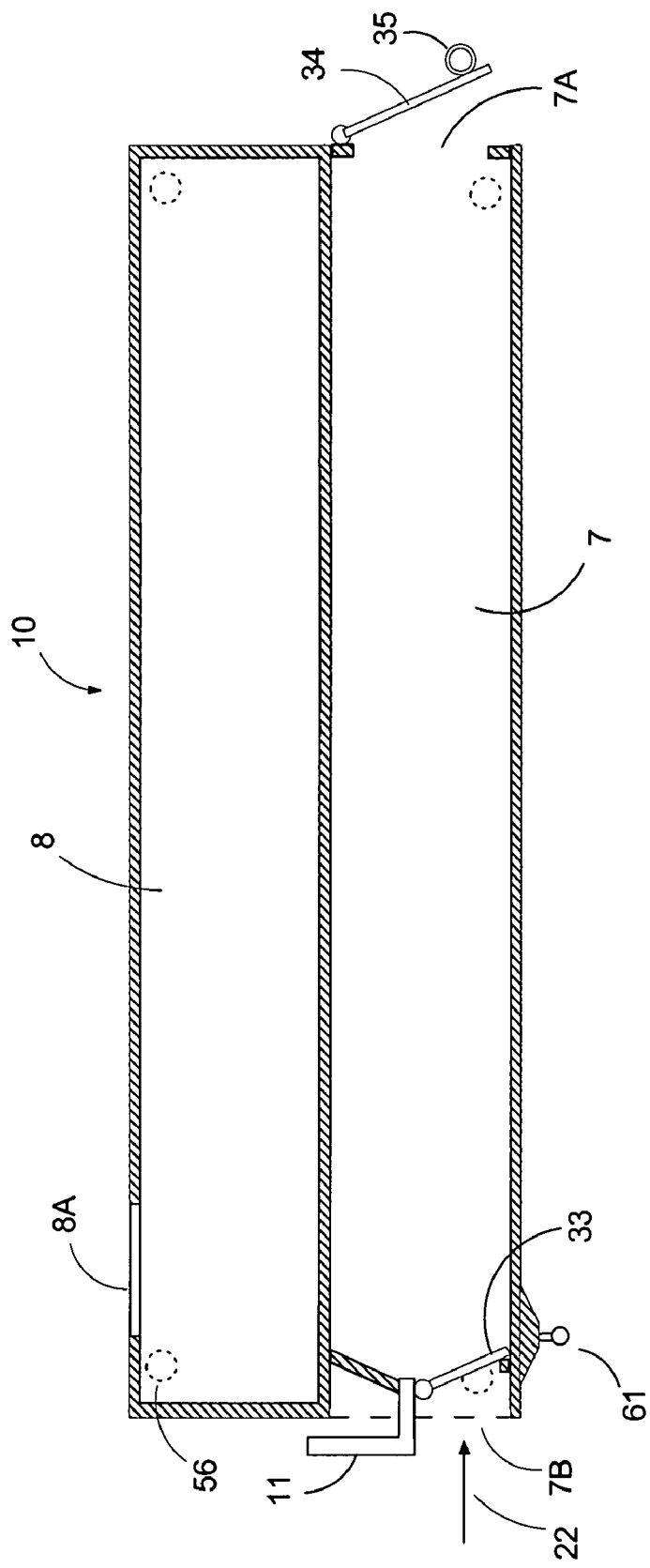
FIG. 2 is a side view of an embodiment of the invention.

FIG. 2 is a side view cut away of an embodiment of module 10. Rear valve 33 is visible, shown positioned in the lower half of the rear end 7B of tubular chamber 7. Gas port 11 is positioned above the rear valve 33. Rear valve 33 enables make up of water to flow into chamber 7 upon a discharge; this greatly increases efficiency, reducing any vacuum within chamber 7 upon discharge. Arrow 22 shows direction of water flow. In some applications involving sediment, this configuration may be reversed with rear valve above gas port 11 to avoid the entrainment of sediment during makeup. Optional front valve 34 is also visible; front valve may be a check valve, control valve, solenoid gate valve, etc. Also shown is option eye 35 for controlling front valve 34. Preferably front valve enables fill of chamber 7, as appropriate, whether make up fill through rear end 7B or initial fill upon positioning of subunit 9 within a body of water.

Figure 6:
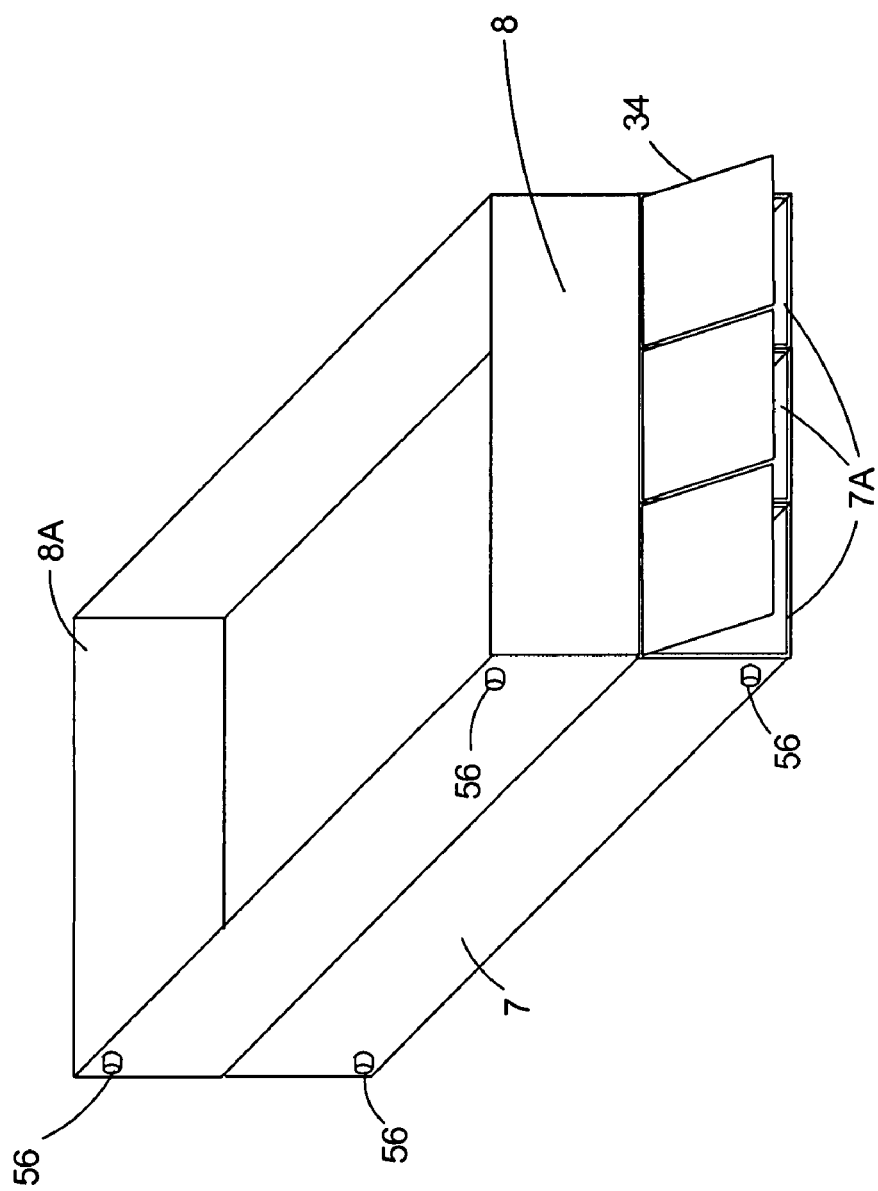
FIG. 6 is a perspective view of an embodiment of the present invention.

In this way, module 10 is capable of being transported to a body of water by road vehicle 60, detached from the road vehicle 60 and wheeled transport unit 65, transferred to a body of water. The module 10 may then be situated within a body of water at a desired location in a substantially horizontal orientation with the ends of the chamber 7 in fluid communication with the body of water, oriented to discharge in a desired direction. Ballast tank 8 may be filled by the admission of ballasting water in order to restrain the module in a desired location; in some cases, module 10 may rest on the bottom of the body of water. An admission of compressed gas into the rear end 7B of the chamber 7 expels water out of the front end 7A of the chamber 7, generating a wave in the body of water. FIG. 6 is an alternative showing a single ballast tank 8 formed by structure from the sides of a plurality of modules 10, also within the scope of this invention. Note that the top surface of module 10 need not be at the top of the sides, such that ballast water port 8A is the opening above the top surface, with ballast tank 8 being an open top tank.

As disclosed in the '393 patent, earlier efforts at a wave cannon were a fixed elongated tubular chamber having a closed rear end and an open front end, an anchor, a supply of compressed air, and a control valve for admitting compressed air into the elongated chamber. The disclosure in the '393 provided substantial anchoring to ground for restraining the device in a single location. The closed rear end of this earlier design consumed great quantities of compressed air for discharge because of the vacuum created. An additional aspect of the earlier design is that it once it was fixed in place, it was not scalable for the production of waves of varying sizes.

Module 10 may be incorporated into watercraft, or used to form its own barge-like watercraft. By way of introduction, a separate watercraft may be any one of a wide variety of crafts having sufficient space, rigidity, and displacement. The watercraft should be suited to the topography of interest, the generally expected sea conditions of the body of water, and the overall circumstances of application. For example, in some embodiments, the watercraft may be a powered service or utility type vessel, capable of rapid relocation to accommodate changes in conditions. In other embodiments, an inexpensive, un-powered barge or lighter may be appropriate, typically providing a keyway, push block, or some other means for relocation by a tug or other vessel.

Figure 3:
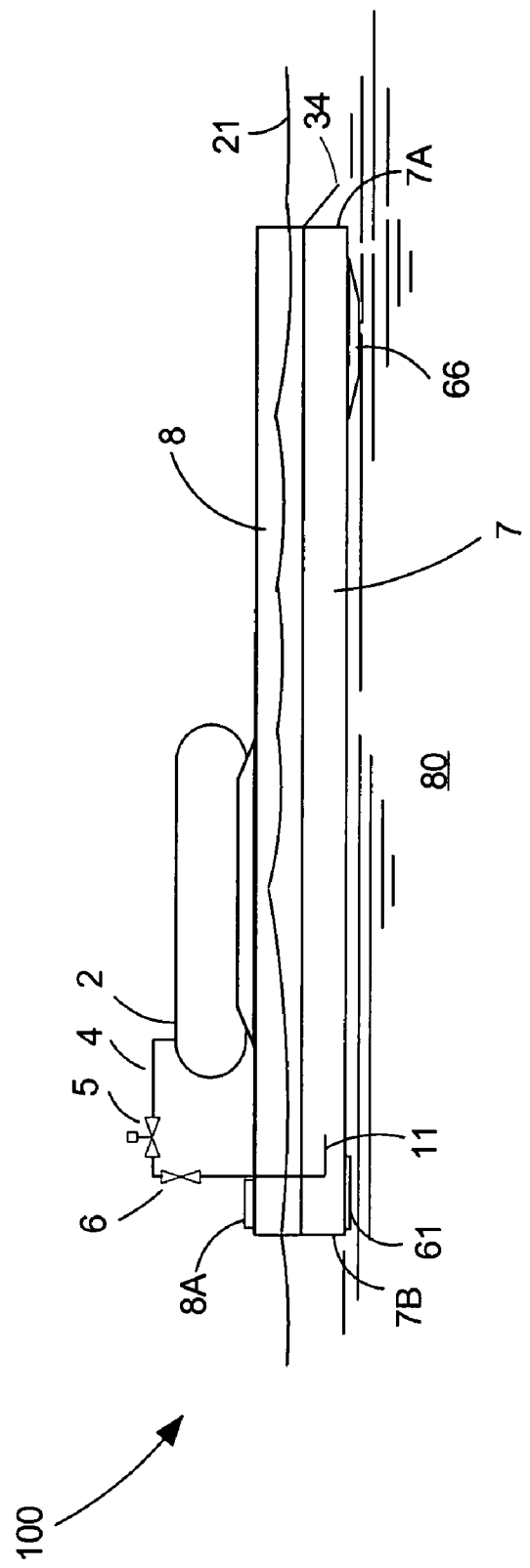
FIG. 3 is a side view cutaway of a barge embodiment of the invention in use.

FIG. 3 is a side view of a relatively simple embodiment of the present invention showing watercraft 100 as a barge formed from a plurality of modules 10, each having elongated tubular chambers 7. Optionally, a module 10 may be of sufficient predetermined width to be used singly. Modules 10 may be held together by connecting system 50 (not shown). A supply of compressed air 2 may be placed onto watercraft 100 formed by the modules 10. Piping 4 may bring compressed air to gas port 11 proximate to rear end 7B of chamber 7, creating fluid communication of compressed air from pressure storage tank 2 to rear end 7B of chamber 7. Shown within piping 4 is mounted control valve 5 for controlling air to chamber 7. Note that watercraft 100 is shown as resting on bottom 80 and water surface 21. Thus, subunits 9 may be used within the structure forming watercraft 100.

Chamber 7 is in fluid communication with water 21 through rear end 7B and optionally front end 7A of chamber 7, which is shown as extending through hull of watercraft 100 in a desired direction. Chambers 7 may be anchored, restrained, or held in place by ballast tank 8. Note that although water may enter chamber 7, the interior of chamber 7 is the only surface or equipment exposed to surrounding water, reducing corrosion of the wave generating system.

A supply of compressed air is provided by at least one pressure storage tank 2 and piping 4, creating fluid communication of compressed air from pressure storage tank 2 to rear end 7B of chamber 7. Within piping 4 is mounted control valve 5 for controlling air to chamber 7. Actuation of control valve 5 releases compressed air into rear end 7B of chamber 7, expelling water from chamber 7 out front end 7A and creating a wave 24 (not shown).

Thus, multiple modules 10 and chambers 7 may be formed into or mounted onto a single watercraft 100. Preferably, however, the distribution of chambers 7 will be symmetric if simultaneous discharge is desired. Such coordinated or simultaneous discharge will concentrate the energy transfer for better wave characteristics. Multiple chambers 7 may be situated symmetrically with respect to the centerline of watercraft 100 for improved stability.

Figure 4:
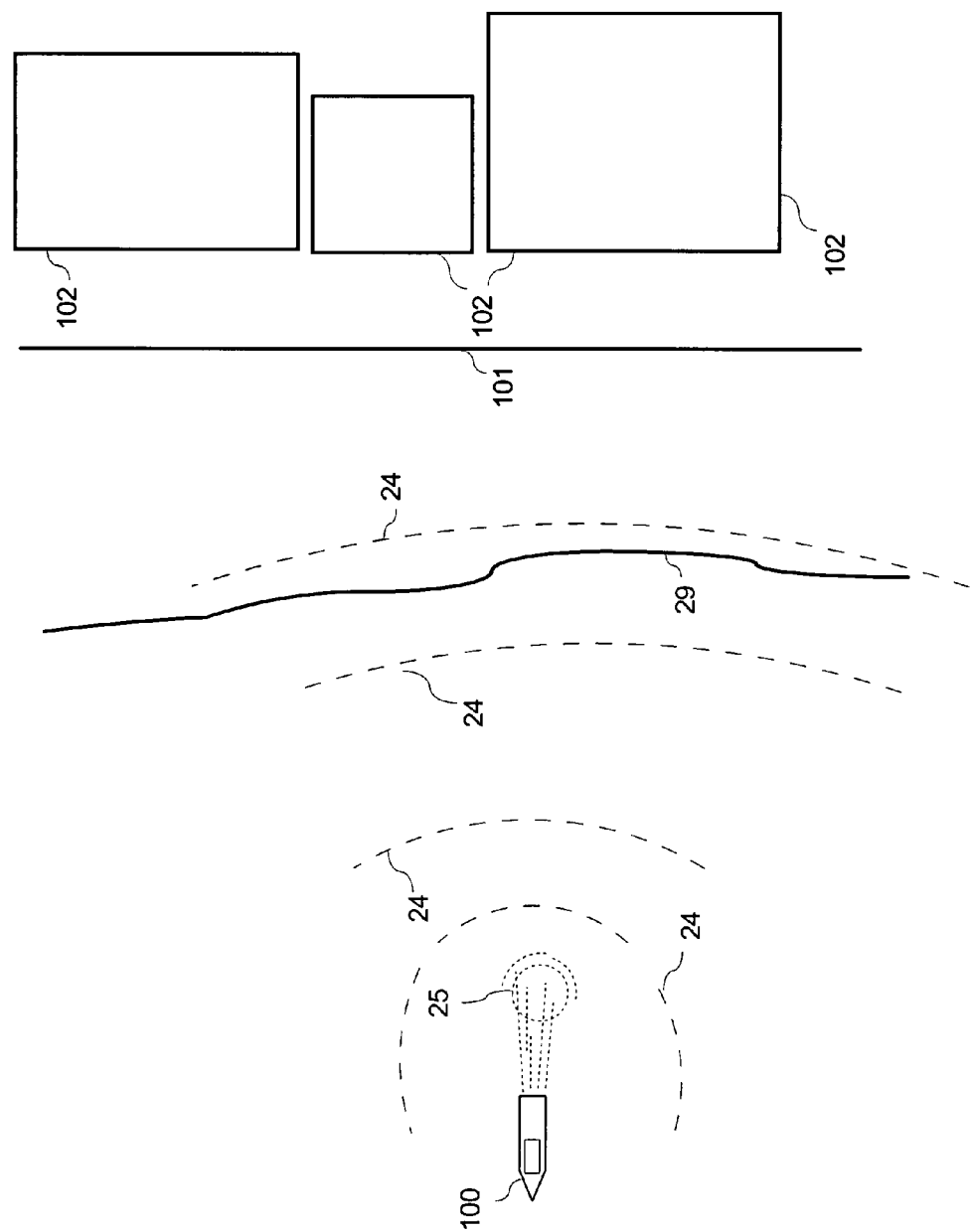
FIG. 4 is a top view of an embodiment of the invention.

With reference to the top view of FIG. 4, upon watercraft 100 reaching a desired location and orientation with shore 29, watercraft 100 may be restrained by anchoring system 90 (not shown).

FIG. 4 thus depicts an embodiment of the present invention 100 in operation. A shoreline 29 of a typical beach is shown. Watercraft 100 is moored using a four point mooring system 50. A suggested location for operation might be a beach having multiple hotels 102, such that the expense of the present invention may be borne by multiple parties within the tourism industry. Exhausting compressed air 25 demonstrates the genesis of a swell. As waves 24 radiate to shoreline 29, the increasingly shallow topography results in a breaking action, creating surf. The escaping gas and water generate a recoil force against the chamber 7. As noted above, the present invention may transfer a portion of recoil force to a recoil force system, and then the remainder of the recoil force to the structure of the watercraft 100. If wave 24 is generated off the stern of watercraft 100, it is forced forward. This forward movement is restrained by mooring system 50. If the need for waves is recurrent, then mooring buoys or other attachment points for watercraft 100 may be provided.

Given the shallowness of many shorelines, in many embodiments, preferably watercraft 100 will be of shallow draft. A flat or partially flat bottom may be appropriate for particularly shallow embodiments. In some embodiments, watercraft 100 may incorporate the ability to flood buoyancy tanks to submerge partially. In that case, a flat or partially flat bottom may also be desirable. In other embodiments, watercraft 100 may be of catamaran design, with chambers 7 that might be lowered into water for operation and withdrawn for transportation.

Figure 5:
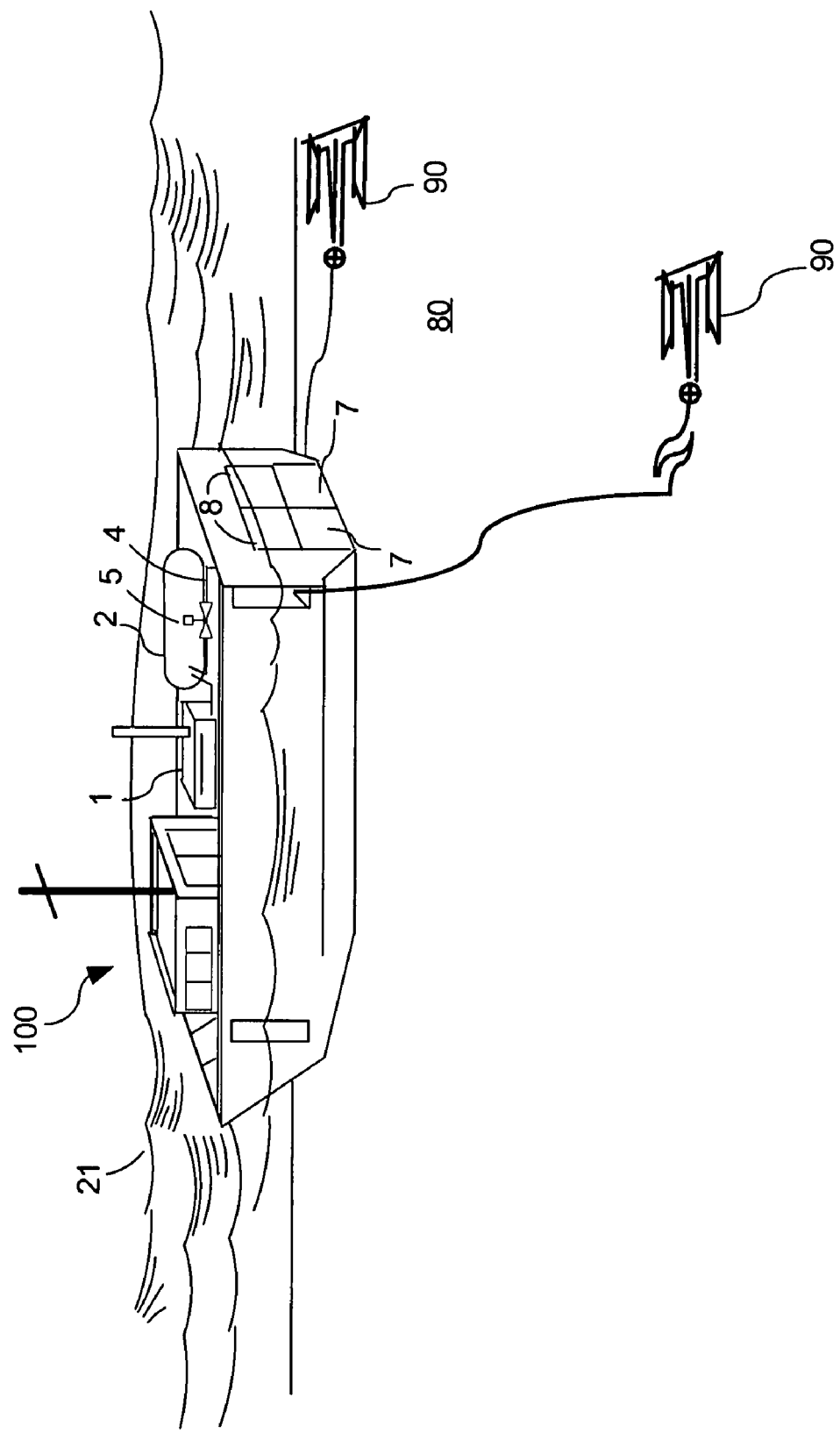
FIG. 5 is a perspective view of an embodiment of the invention connected to a watercraft.

FIG. 5 shows watercraft 100 in body of water 21. Connecting system 50 optionally includes corresponding connecting structure on watercraft 100 for mounting modules 10. Front ends 7A of chambers 7 are shown. An optional form of anchoring system 90 on bottom 80 is shown, such that watercraft 100 secures the modules 10 in place. Anchoring system 90 may be a ballast tank 8 (ballasting to the bottom of the body of water) or separate deck tackle 90 as shown, such as lines or chains for tying to bollards or buoys, jack leg lifts, a combination anchor and ballasting submergence system, helical mooring systems, ground anchors, etc., so long as it is adapted to restrain watercraft 100 in position during discharge of chambers 7. That is, anchoring system 90 should be adapted to maintain the location of watercraft 100, which will tend to move forward during discharge of chambers 7 due to the reaction force. In this case, watercraft 100 is in the form of a catamaran shaped hulled vessel. Also shown are air compressor 1, pressure storage tank 2, and control valve 5. Chamber front ends 7A for elongated chambers 7 are located for this example in the stern of watercraft 100, symmetric with respect to the centerline of the watercraft 100.

Preferably, however, air compressor 1 may include a power source (not shown), such as a diesel generator with appropriate fuel storage, which brings power for other services on watercraft 100. Alternatively, air compressor 1 may simply be an air compressor having its own power source (e.g., diesel powered air compressor.) Those skilled in the art may readily select such additional auxiliary equipment as appropriate or desired for the size and contemplated use of the watercraft 100.

Returning to FIG. 3, watercraft 100 may be located at a desired offshore or lakeshore location with ballast tanks 8 unfilled, whether under its own power or by the assistance of a tug or other service craft. Watercraft 100 is then oriented for operation and ballast tanks 8 may be filled or an alternative anchoring system 90 deployed. Orientation would involve the steps of directing front ends 7A of chambers 7 towards a direction of interest. Control valve 5 may then be operated to discharge compressed gas along chambers 7, generating swells in the direction desired. Meanwhile, watercraft 100 is forced in the opposing direction of the release.

The above examples should be considered to be exemplary embodiments, and are in no way limiting of the present invention. Thus, while the description above refers to particular embodiments of the present invention, it will be understood that many modifications may be made without departing from the spirit thereof.

What is claimed is:

1. A transportable module for use in generating waves in a body of water, the module capable of being delivered to a desired location by a road vehicle, said module comprising;
    a subunit comprising at least one rigid tubular chamber and at least one rigid ballast tank, wherein:
        the at least one tubular chamber has a predetermined length, a rear check valve located at the rear end to permit flow into the chamber and substantially block flow out of the chamber, and a gas port proximate to the rear end for the admission of compressed gas into the chamber,
        the at least one ballast tank is mounted superposed above the tubular chamber and has dimensions similar to the tubular chamber and a volume substantially equal to or greater than the volume of the tubular chamber, and at least one ballast water port for the admission and removal of ballast water;
        the chamber and ballast tank are integrated together to form an outer surface having a bottom, two sides, and a top;
    a connecting system mounted on the outer surface of the subunit by which the module may be detachably connected in parallel to other such modules in a side to side manner;
    a transport mount on the outer surface of the subunit capable of detachably mating to a wheeled transport unit to support a trailing end of the module when transported by the road vehicle;
    a coupling member affixed to the outer surface of the subunit positioned on the subunit end opposite the trailing end and capable of detachably coupling to a tow point on the road vehicle, by which the module may be towed when the transport mount is coupled to a wheeled unit;
    wherein the module is capable of being transported to a body of water by the road vehicle, detached from the road vehicle and wheeled transport unit, transferred to a body of water, situated within a body of water at a desired location in a substantially horizontal orientation with the front and rear ends of the chamber in fluid communication with the body of water, oriented to discharge in a desired direction, the ballast tank may be filled by the admission of water in order to restrain the module in a desired location, and an admission of compressed gas into the rear end of the chamber expels water out of the front end of the chamber generating a wave in the body of water.

2. The transportable module of claim 1, wherein the tubular chamber is configured such that the rear check valve is positioned substantially in the lower half of the rear end of the tubular chamber and the gas port is positioned above the rear check valve.

3. The transportable module of claim 1, wherein the tubular chamber is configured such that the rear check valve is positioned substantially in the upper half of the rear end of the tubular chamber and the gas port is positioned below the rear check valve.

4. The transportable module of claim 1, wherein the tubular chamber further comprises a front valve located at the front end to permit flow out of the chamber upon discharge and to control flow into the chamber.

5. The transportable module of claim 4, wherein the front valve is a check valve.

6. The transportable module of claim 1, wherein the tubular chamber has a predetermined length equal to or less than the maximum length permitted for transportation by the road vehicle on a predetermined type of road.

7. The transportable module of claim 1, wherein the tubular chamber has a predetermined length equal to or less than about fifty-three feet.

8. The transportable module of claim 1, wherein the tubular chamber has a width of about twelve feet or less.

9. The transportable module of claim 1, wherein the coupling member is a kingpin adapted for mating with a third wheel.

10. The transportable module of claim 1, wherein the connecting system includes at least one projecting tab mounted on the side of the module and defining a first connecting hole capable of overlapping a tab projecting from the opposing side of an adjacent module defining a second hole, and a connecting fastener adapted to pass through the first and second holes within the tabs so as to connect adjacent modules in a side to side manner.

11. The transportable module of claim 1, wherein the connecting system may be detachably connected to a corresponding connecting system mounted on a watercraft.

12. A module for use in generating waves in a body of water, the module comprising;
- a subunit comprising at least one rigid tubular chamber and at least one rigid ballast tank, wherein:
  - the at least one tubular chamber has a rear valve located at the rear end to permit flow into the chamber and substantially block flow out of the chamber, a front valve located at the front end to permit flow out of the chamber and to control flow into the chamber, a predetermined length and width, and a gas port proximate to the rear end for the admission of compressed gas into the chamber,
  - the at least one ballast tank is mounted superposed above the tubular chamber and has dimensions similar to the tubular chamber and a volume substantially equal to or greater than the volume of the tubular chamber, and at least one ballast water port for the admission and removal of ballast water; and
  - the chamber and ballast tank are integrated together to form an outer surface having a bottom, two sides, and a top;
- a connecting system mounted on the outer surface of the subunit by which the module may be detachably connected in parallel to other such modules in a side to side manner;
- wherein the module is capable of being situated in a desired location within a body of water in a substantially horizontal orientation with the front end of the chamber in fluid communication with the body of water, oriented to discharge in a desired direction, the ballast tank may be filled by the admission of ballasting water in order to restrain the module in a desired location, and an admission of compressed gas into the rear end of the chamber expels water out of the front end of the chamber generating a wave in the body of water.

13. The module of claim 12, wherein the connecting system mounted on the outer surface of the subunit further includes connectors for detachably mating to a corresponding connecting system mounted on a water craft.

14. The module of claim 12, wherein the tubular chamber has a predetermined length equal to or less than the maximum length permitted for transportation by the road vehicle on a predetermined type of road.

15. The module of claim 12, wherein the tubular chamber has a predetermined length equal to or less than about fifty-three feet.

16. The module of claim 12, wherein the tubular chamber has a width of about twelve feet or less.

17. A module for use in generating waves in a body of water, the module comprising;
- a chamber having a predetermined length and width, a rear valve located at the rear end to permit flow into the chamber and substantially block flow out of the chamber, a front valve located at the front end to permit flow out of the chamber and to control flow into the chamber, a gas port proximate to the rear end for the admission of compressed gas into the chamber, wherein the predetermined length and width of the chamber are equal to or less than the maximum length permitted for transportation on a predetermined type of road;
- an anchoring system;
- a connecting system mounted on the outer surface of the chamber by which the chamber may be detachably connected in parallel to other such chambers in a side to side manner;
- wherein the chamber is capable of being transported to a desired location within a body of water, placed in a substantially horizontal orientation with the front end of the chamber in fluid communication with the body of water, oriented to discharge in a desired direction, connected to the anchoring system in order to restrain the chamber in a desired location, and an admission of compressed gas into the rear end of the chamber expels water out of the front end of the chamber generating a wave in the body of water.

18. The module of claim 17, wherein the anchor system is at least one ballast tank mounted to the chamber.

19. The module of claim 17, wherein the anchor system is a ballast tank mounted superposed above the chamber and providing a volume substantially equal to or greater than the volume of the chamber, and at least one ballast water port for the admission and removal of ballast water.

20. The module of claim 17, wherein the connecting system may be detachably connected to a corresponding connecting system mounted on a watercraft and wherein the anchoring system is provided by the watercraft.

* * * * *